N. MARSHALL.
OUTLET BOX.
APPLICATION FILED JUNE 1, 1909.
1,031,564.
Patented July 2, 1912.
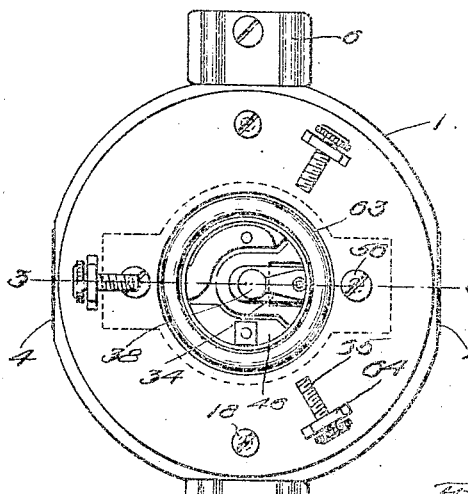
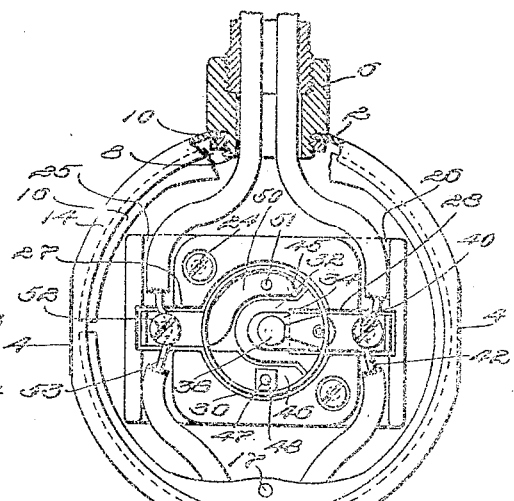
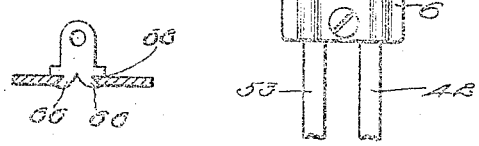
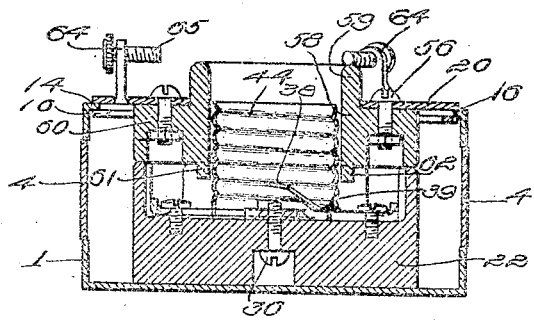
Witnesses:
Inventor.
Norman Marshall

UNITED STATES PATENT OFFICE.

NORMAN MARSHALL, OF NEWTON, MASSACHUSETTS, ASSIGNOR, BY MESNE ASSIGNMENTS, TO ARROW ELECTRIC COMPANY, OF HARTFORD, CONNECTICUT, A CORPORATION OF CONNECTICUT.

OUTLET-BOX.

1,031,564.   Specification of Letters Patent.   Patented July 2, 1912.

Application filed June 1, 1909. Serial No. 499,505.

*To all whom it may concern:*

Be it known that I, NORMAN MARSHALL, a citizen of the United States, residing at Newton, in the county of Middlesex and State of Massachusetts, have invented certain new and useful Improvements in Outlet-Boxes; and I do hereby declare the following to be a full, clear, and exact description of the invention, such as will enable others skilled in the art to which it appertains to make and use the same.

The invention relates to outlet boxes such as are used in connection with interior conduit systems for electric wiring, and more especially to outlet boxes which are adapted for supporting rosettes, receptacles and analogous electric fittings.

One object of the invention is to provide an outlet box to which an electric fitting may be readily and conveniently secured in any desired position with relation to the outlet box or the pipe end or conductor to which it is attached.

A further object is to provide means whereby a cover may be readily secured to the outlet box in correct relation with the electric fitting secured to the box.

A further object is to provide means on the cover of the outlet box for holding a lamp shade.

To these ends one feature of the invention consists in providing an outlet box with means whereby an electrical device, such as a receptacle, may be secured to the box in accordance with the location of the electrical connections to which it is to be attached, and means whereby the cover may be readily attached to the box and hold the cap for the receptacle in correct relation with the base of the receptacle.

Further features of the invention relate to means for attaching the pipe end to the outlet box, to the means for securing a cable to the box, and to the means for holding a lamp shade upon the cover to adapt the outlet box for use as a lighting fixture.

The various features of the invention will be readily understood from an inspection of the accompanying drawings, in which an outlet box is shown embodying the invention in its preferred form.

In the drawings Figure 1 is a plan view of the complete outlet box; Fig. 2 is a plan view of the outlet box and the receptacle with the cover removed and with parts broken away and in section; Fig. 3 is a central vertical section taken on the line 3—3 in Fig. 1; and Fig. 4 is a detail view of one of the shade supporting arms.

The outlet box shown in the drawings consists of a casing 1 drawn up from sheet metal, and is provided with several apertures 2 through which the electric conductors may enter the box, and in which devices for securing the box to the ends of pipes may be located. These apertures are closed by removable knock-out plugs 4, any of which may be removed to provide an aperture at the desired point in the box. Projecting through the unobstructed apertures are coupling members 6 which are threaded externally at their inner ends 8 for a portion of their length, and internally threaded at their outer ends for connection with a pipe end. A polygonal nut 10 engages the threaded end 8 and its facets are adapted to engage the bottom of the box to prevent it from turning. By turning the coupling member 6 by means of a wrench, the nut may be tightly drawn against the interior of the wall of the box, thus securing the coupling member in position. The nut is held from turning by engagement with the bottom of the box whatever its position on the screw-threaded portion 8 and no wrench or other device is therefore required for holding the nut against rotation within the box while the parts are being secured together. The parts may therefore be secured together conveniently and quickly under conditions which would render it impracticable to otherwise hold the nut from turning. A set screw 12 may be threaded through the coupling member near its outer end whereby a cable may be held within the member instead of a pipe end.

The walls of the box are turned in at its open side to form an inwardly extending flange 14 which retains a split ring 16 within the box. The diameter of the split ring is such that it underlies the flange and may be utilized as a retaining plate for engaging the underside of the flange and retaining the cover on the box. The split in the ring allows the ring to be contracted so that it may readily and conveniently pass through the opening bounded by the flange and may then be allowed to expand to a diameter larger than the diameter of the opening. The split ring rests upon the nuts 10 when the box is open, and thus facilitates the assembling operation when the cover is being attached to the box. The split ring is provided at diametrically opposite points with screw threaded holes 17 for the reception of the securing screws 18 by which the cover and ring are connected together and are drawn into clamping engagement with opposite sides of the flange when the screws are tightened. The split ring is rotatably mounted in the box, and is thus adapted to be moved into correct position for holding the cover in place, depending upon which knock-out plugs are removed.

Mounted upon the bottom of the box is an insulating base 22 which is secured thereto by means of screws 24. The base is formed with two transverse grooves or channels 25 and 26 which communicate by means of lateral recesses or channels 27 and 28 respectively with a central circular recess 30. The bottom of the recess 30 is raised to form a ledge 32 having a semicircular end and providing a support for the center contact plate 34 of the receptacle which is held in place by a screw 36 extending upwardly through the base and threaded into the plate. A resilient contact member 38 is secured to the plate 34 by means of a rivet 39, and a binding screw 40 is mounted near the outer end of the plate, by means of which a line wire 42 may be connected to the receptacle. A screw threaded metal shell 44 is mounted within the center recess 30, and provided with inwardly turned flanges 45 and 46 at its bottom. A screw 47 passes through the flange 46, and is provided with a nut 48 by means of which the flange is held against the bottom of the recess 30. A contact plate 50 overlies the flange 45, and is held against the flange by a screw 51 passing through the base 22 and threaded into the plate 50. The plate 50 extends through the lateral recess 27 into the transverse recess or channel 25, and is provided near its outer end with a binding screw 52, by means of which the line wire 53 is connected to the receptacle. In the present instance the line wires 42 and 53 are shown passing continuously through the outlet box and the diametrically opposite coupling members. Obviously, when the box is to be used at the end of a line only one opening need be provided, and the ends of the line wires 42 and 53 will be held by the binding screws 40 and 52 respectively. The bottom of the box is provided with four screw threaded holes for the screws 24 which are symmetrically located so that the base 22 may be mounted in the position shown in the drawing, or at right angles thereto, according to which set of knock-out plugs is removed.

Attached to the cover 20 by means of screws 56 is a cap 58 for the receptacle composed of insulating material. The cap comprises a central annular portion 59 projecting through a hole 63 in the cover 20, and laterally extending flanges 60 covering the recesses 27 and 28. The cover is secured to the cap by screws 56. Depending from the under side of the flanges 60 are projections 61 and 62 which register with the recesses 27 and 28 respectively, and aid in properly locating the cap with respect to the base when the device is being assembled. In addition the projection 62 forms a partial insulating barrier between the binding screw 40 and the shell 44.

Mounted upon the cover 20 are a plurality of arms 64, each provided with a clamping screw 65 for holding a lamp shade. The arms 64 are bifurcated at their inner ends to form two prongs 66 which are headed over against the beveled sides of the holes 68 formed in the cover 20, as shown in Fig. 4, to secure the arms to the cover. The outlet box is thus adapted for use as a lighting fixture when a lamp is held in the shell 44; or a plug may be attached to the receptacle for conducting the current to a more remote location.

While I prefer to employ the construction and arrangement of device shown and described, it will be understood that the invention is not confined to this construction, and that the construction and arrangement of the parts may be varied and modified without departing from the invention.

Having explained the nature and object of the invention, and specifically described one form of outlet box in which it may be embodied, what I claim is:—

1. The combination of an outlet box provided with a cover having an aperture, a receptacle base of insulating material secured to the bottom of the box and having electrical contacts mounted thereon, a cap of insulating material for the receptacle comprising an annular portion extending through the aperture in the cover and laterally extending flanges, and means coöperating with the flanges for securing the cap to the cover, substantially as described.

2. The combination of an outlet box provided with a cover having an aperture, a receptacle base of insulating material secured to the bottom of the box and having transverse recesses for the reception of line wires and lateral recesses communicating with said transverse recesses, conducting members extending through the lateral recesses, and a cap for the receptacle composed of insulating material secured to the cover and having projections adapted to enter the lateral recesses on the base, substantially as described.

3. An outlet box provided with an inwardly extending flange, an annular ring for engaging the under side of the flange split to allow it to be contracted, a cover, and means for securing the cover and ring together, substantially as described.

4. An outlet box provided with an inwardly extending flange, an annular ring for engaging the under side of the flange split to allow it to be contracted, a cover, and screws connecting the cover and split ring for drawing them into clamping engagement with the opposite sides of the flange, substantially as described.

In testimony whereof I affix my signature, in presence of two witnesses.

NORMAN MARSHALL.

Witnesses:
　IRA L. FISH,
　N. D. McPHAIL.